(12) United States Patent
Schram et al.

(10) Patent No.: US 9,495,919 B2
(45) Date of Patent: Nov. 15, 2016

(54) ELECTROWETTING DEVICE

(71) Applicant: Liquavista B.V., Eindhoven (NL)

(72) Inventors: Ivar Schram, Weert (NL); Chiara Cometti, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 169 days.

(21) Appl. No.: 14/293,328

(22) Filed: Jun. 2, 2014

(65) Prior Publication Data

US 2014/0266992 A1 Sep. 18, 2014

Related U.S. Application Data

(63) Continuation of application No. PCT/EP2012/074175, filed on Nov. 30, 2012.

(30) Foreign Application Priority Data

Dec. 2, 2011 (GB) .................................. 1120782.6

(51) Int. Cl.
*B32B 3/02* (2006.01)
*G09G 3/34* (2006.01)
*G02B 26/00* (2006.01)

(52) U.S. Cl.
CPC ............. *G09G 3/348* (2013.01); *G02B 26/005* (2013.01)

(58) Field of Classification Search
CPC ................ G02B 26/005; G09G 3/348; Y10T 428/24802
See application file for complete search history.

(56) References Cited

U.S. PATENT DOCUMENTS

| 7,821,699 | B1 | 10/2010 | Lo et al. | |
|---|---|---|---|---|
| 2009/0168144 | A1 | 7/2009 | Lo et al. | |
| 2009/0169806 | A1 | 7/2009 | Lo et al. | |
| 2011/0013255 | A1* | 1/2011 | Hsieh | G02B 3/14 359/290 |
| 2012/0275009 | A1* | 11/2012 | Vermeulen | G09G 3/348 359/290 |
| 2013/0010348 | A1* | 1/2013 | Massard | G02B 26/005 359/290 |

FOREIGN PATENT DOCUMENTS

| GB | 2453815 A | 4/2009 |
|---|---|---|
| WO | 03071346 A1 | 8/2003 |
| WO | 2005098797 A2 | 10/2005 |
| WO | 2009065909 A1 | 5/2009 |
| WO | 2011058019 A1 | 5/2011 |
| WO | 2011113787 A1 | 9/2011 |

OTHER PUBLICATIONS

Lao et al., "Ultra-High Transmission Electrowetting Displays Enabled by Integrated Reflectors", Journal of Display Technology, Display Technology Letters, pp. 120-122, Jun. 2008, vol. 4, No. 2.

* cited by examiner

*Primary Examiner* — Elizabeth Mulvaney
(74) *Attorney, Agent, or Firm* — EIP US LLP

(57) ABSTRACT

A method of manufacturing a support plate for an electrowetting device includes providing a first hydrophobic layer on a substrate, reducing the hydrophobicity of a surface of the first hydrophobic layer and providing a second hydrophobic layer on at least part of the surface with reduced hydrophobicity.

25 Claims, 1 Drawing Sheet

ELECTROWETTING DEVICE

CROSS REFERENCE TO RELATED APPLICATIONS

This application is a continuation under 35 U.S.C. §120 of PCT Application No. PCT/EP2012/074175 filed Nov. 30, 2012.

BACKGROUND

Known electrowetting display devices include two support plates. A pattern of walls is arranged on one of the support plates, the pattern defining the picture elements of the display device. The area between the walls of a picture element, also known as a pixel, is called the display area, over which a display effect occurs. The walls of the picture elements are made of a hydrophilic material. The area of the support plate in the display area may to a large extent be hydrophobic for a proper operation of the picture element. During manufacture the area of the support plate where the picture elements are located is covered by a hydrophobic layer. The walls are made on this layer by depositing a layer of wall material on the hydrophobic layer and patterning the layer of wall material using e.g. a photo-lithographic method.

The adhesion between the layer of wall material and the hydrophobic layer is relatively poor, causing easy peel off of the layer of wall material from the hydrophobic layer. It is known to lower the hydrophobicity of the hydrophobic layer prior to applying the layer of wall material. After the formation of the walls, the area of the hydrophobic layer between the walls is annealed to regain its hydrophobicity. However, the quality of display devices made using this method is not satisfactory.

It is desirable to provide a method for making an electrowetting display device that does not have this disadvantage.

DETAILED DESCRIPTION

Figure 1:
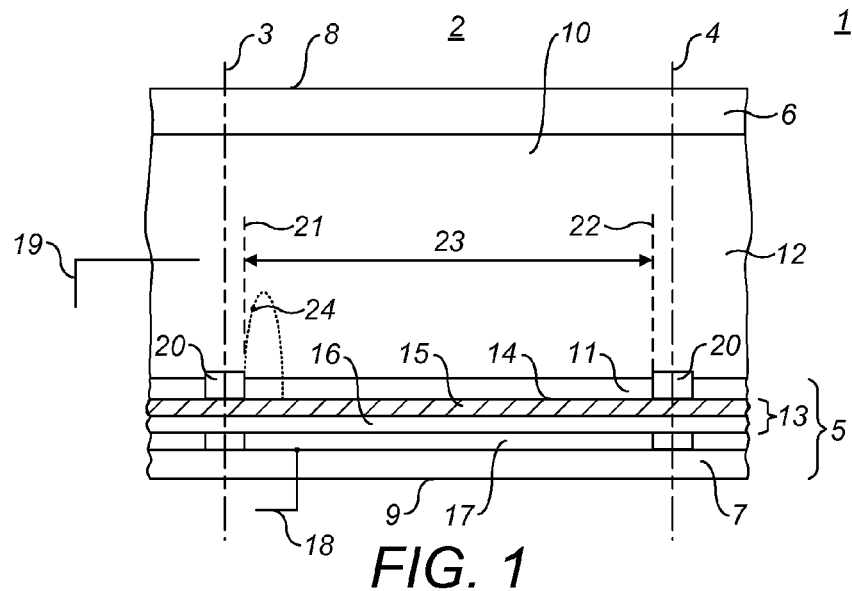
FIG. 1 shows a schematic cross section of a picture element of an electrowetting display device.

The entire contents of the following patent documents are incorporated by reference herein:
1. GB 1120782.6 filed Dec. 2, 2011
2. PCT/EP2012/074175 filed Nov. 30, 2012

Embodiments described herein relate to a method of manufacturing a support plate, particularly for an electrowetting device.

In accordance with first embodiments, there is provided a method of manufacturing a support plate for an electrowetting device, including: providing a substrate; providing a first hydrophobic layer on the substrate; reducing the hydrophobicity of a surface of the first hydrophobic layer; and providing a second hydrophobic layer on at least part of said surface with reduced hydrophobicity.

These embodiments are based on the recognition that the unsatisfactory quality of known display devices using the annealing step is due to the reduced quality of the surface of the hydrophobic layer caused by the steps of lowering and increasing the hydrophobicity. Such reduced quality of the surface in the display area, i.e. the area of a picture element inside the walls, gives a lower hydrophobicity than the hydrophobic layer before the steps of hydrophobicity reduction and annealing; this affects the lifetime of the display device, fluid switching properties in an electrowetting device and the reproducibility of the manufacturing process.

In the present embodiments, providing the second hydrophobic layer provides a surface with a greater hydrophobicity for contact with a first fluid to be described below, compared with known methods where the surface hydrophobicity is restored using a method of thermal reflow, i.e. annealing, at for example 220° C.

Providing the second hydrophobic layer in the present embodiments may provide a pristine hydrophobic surface in the electrowetting device in which the support plate is assembled. Thus, for the example of a display device, filling of the device with first fluid having an affinity for a hydrophobic surface is improved compared with known display devices. Further, for example, a pristine second hydrophobic layer surface encourages defect free and uniform spreading of for example the first fluid described below on its surface, which improves motion of the first fluid when switching its configuration to change a display effect.

The phrase "on the substrate" used herein, for example for providing the hydrophobic layer on the substrate, is to be understood to mean supported by the substrate but not necessarily adjoining the substrate. Therefore, in the example where the first hydrophobic layer is provided on the substrate the first hydrophobic layer might be provided directly in contact with the substrate, or alternatively may be provided on the substrate with at least one further layer separating the substrate and the first hydrophobic layer. The term "providing" used herein in relation to steps of a method of the embodiments may be taken to mean applying or forming.

It is noted that a known method relates to solving a similar problem as the present embodiments, but that its teaching is different from the present embodiments.

In an embodiment, after reducing the hydrophobicity of the surface of the first hydrophobic layer, a pattern of hydrophilic material may be provided on a first part of the surface and the second hydrophobic layer is provided on a second part of the surface. This methodology allows for example a hydrophilic structure, for example a wall structure of an electrowetting display device, to be provided simply and easily and with suitable adhesion to the surface, in accordance with embodiments.

In another embodiment, the second hydrophobic layer may be provided in a pattern to form at least one display area for a picture element of an electrowetting display device. Thus, a simple and effective method of forming a display area is provided, the display area having greater hydrophobicity as described above in accordance with embodiments.

Further, the hydrophobicity of the first hydrophobic layer provided on the substrate may be different from, or substantially the same as, the hydrophobicity of the second hydrophobic layer. In such embodiments, the material of the first hydrophobic layer and the second hydrophobic layers may be selected to be the same as or different from each other. Thus, the properties of the two hydrophobic layers may be tuned depending on their required function. This gives a designer of such an electrowetting device more design freedom. For example, the first hydrophobic layer material may be chosen to have a long lifetime in the presence of the applied voltage, given its proximity to an electrode on the substrate. The second hydrophobic layer material may instead be chosen to provide optimum control and switching of a fluid on its surface. By tuning the hydrophobicity of the first and second layers, the following may be controlled to provide optimum switching: fluid switching speed, lifetime of the support plate, consistency and direction of fluid motion on the surface of the second hydrophobic layer when a voltage is applied. The term substantially the same means that the hydrophobicity of the first and second hydrophobic layers is the same within normal manufacturing tolerances.

Furthermore, the second hydrophobic layer may be provided using inkjet printing, slit coating, flex printing, screen printing or spin coating. Accordingly, many techniques may be used to provide the second hydrophobic layer; the method of the present embodiments is therefore versatile. Inkjet printing, for example, provides an accurate and quick method of providing the second hydrophobic layer, even for a thin layer.

In another embodiment, the second hydrophobic layer is provided with a thickness of 40 to 110 nanometers, 45 to 105 nanometers or 50 to 100 nanometers. Such thicknesses of the second hydrophobic layer give improved fluid control and switching on its surface. The thickness of the second hydrophobic layer may be notably thinner than the thickness of the first hydrophobic layer. The thickness is taken in a direction perpendicular a plane of the substrate. With such a thickness the second hydrophobic layer may have a uniform, pinhole free surface for giving acceptable first fluid motion and control of its configuration.

In other embodiments, there may be provided on the substrate at least one electrode, and a barrier layer on the at least one electrode, the first hydrophobic layer being provided on the barrier layer. Such an arrangement may otherwise be referred to as a partly assembled support plate and is suitable for an electrowetting device, for example an electrowetting display device.

The first hydrophobic layer provided may have a thickness of 350 to 850 nanometers, 375 to 825 nanometers or 400 to 800 nanometers. In such embodiments it has been found that the first hydrophobic layer has a good lifetime when exposed to a changing applied voltage, without breaking down from continual voltage exposure. The lifetime is influenced also by the material of the first hydrophobic layer and the fact the support plate comprises more than one hydrophobic layer. The thickness is taken in a direction perpendicular a plane of the substrate.

According to a second embodiment, there is provided a support plate for an electrowetting device, the support plate comprising a substrate, at least one layer on the substrate, a first hydrophobic layer on the at least one layer and a second hydrophobic layer on at least part of the first hydrophobic layer. The second hydrophobic layer may be patterned to form at least one display area for a picture element of an electrowetting display device, and the hydrophobicity of the first hydrophobic layer may be different from, or substantially the same as, the hydrophobicity of the second hydrophobic layer. Further, the first hydrophobic layer may be thicker than the second hydrophobic layer and the first hydrophobic layer may have a thickness of 350 to 850 nanometers, 375 to 825 nanometers or 400 to 800 nanometers, and the second hydrophobic layer may have a thickness of 40 to 110 nanometers, 45 to 105 nanometers or 50 to 100 nanometers. The at least one layer may comprise at least one electrode and a barrier layer on the at least one electrode. Such embodiments are similar to those described previously in relation to the first embodiments.

According to a further embodiment, there is provided an electrowetting device comprising the support plate in accordance with any embodiment. The electrowetting device may be an electrowetting display device. Such an electrowetting device therefore has the features provided by an embodiment described herein.

FIG. 1 shows a diagrammatic cross-section of part of an electrowetting device in the form of an electrowetting display device 1. The display device includes a plurality of picture elements 2, one of which is shown in the Figure. The lateral extent of the picture element is indicated in the Figure by two dashed lines 3, 4. The picture elements comprise a first support plate 5 and a second support plate 6. The support plates may be separate parts of each picture element, but the support plates may be shared in common by the plurality of picture elements. The support plates may include a glass or polymer substrate 6, 7 and may be rigid or flexible.

The display device has a viewing side 8 on which an image or display formed by the display device can be viewed and a rear side 9. In the Figure the first support plate 5 faces the rear side 9; the second support plate 6 faces the viewing side; alternatively, the first support plate may face the viewing side. The display device may be of the reflective, transmissive or transflective type. The display device may be of a segmented display type in which the image may be built up of segments, each segment including several picture elements. The display device may be an active matrix driven display type or a passively driven display device. The plurality of picture elements may be monochrome. For a colour display device the picture elements may be divided in groups, each group having a different colour; alternatively, an individual picture element may be able to show different colours.

A space 10 between the support plates is filled with two fluids: a first fluid 11 and a second fluid 12 at least one of which may be a liquid. The second fluid is immiscible with the first fluid. The second fluid is electrically conductive or polar, and may be water or a salt solution such as a solution of potassium chloride in water. The second fluid may be transparent, but may be coloured, white, absorbing or reflecting. The first fluid is electrically non-conductive and may for instance be an alkane like hexadecane or (silicone) oil.

The first fluid absorbs at least a part of the optical spectrum. The first fluid may be transmissive for a part of the optical spectrum, forming a colour filter. For this purpose the first fluid may be coloured by addition of pigment particles or a dye. Alternatively, the first fluid may be black, i.e. absorb substantially all parts of the optical spectrum, or reflecting. A reflective layer may reflect the entire visible spectrum, making the layer appear white, or part of it, making it have a colour.

The support plate 5 includes an insulating layer 13. The insulating layer may be transparent or reflective. The insulating layer 13 may extend between walls of a picture element. However, to avoid short circuits between the second fluid 12 and electrodes arranged under the insulating layer, layers of the insulating layer may extend uninterrupted over a plurality of picture elements 2, as shown in the Figure. The insulating layer has a hydrophobic surface 14 facing the space 10 of the picture element 2. The thickness of the insulating layer may be less than 2 micrometer, and may be less than 1 micrometer.

The insulating layer may be a hydrophobic layer; alternatively, it may include a hydrophobic layer 15 and a barrier layer 16 with predetermined dielectric properties, the hydrophobic layer 15 facing the space 10, as shown in the Figure.

Figure 3:
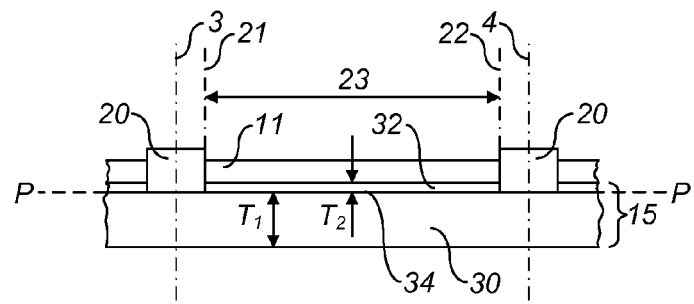
FIG. 3 shows a cross section of the hydrophobic layers of the first support plate.

The hydrophobic layer is schematically illustrated in FIG. 1 and comprises a first hydrophobic layer and a second hydrophobic layer (not indicated in FIG. 1 for clarity); further details will be described below with reference to FIG. 3. The barrier layer 16 may have a thickness, taken in a direction perpendicular the plane of the substrate, between 100 nm and 150 nm and may be made of an inorganic material like silicon oxide or silicon nitride or a stack of these (for example, silicon oxide-silicon nitride-silicon oxide) or an organic material like polyimide or parylene. The barrier layer may comprise multiple layers having different dielectric constants.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each element 2 includes an electrode 17 as part of the support plate 5. The electrode 17 is separated from the fluids by the insulating layer 13; electrodes of neighbouring picture elements are separated by a non-conducting layer. In some embodiments, further layers may be arranged between the insulating layer 13 and the electrode 17. The electrode 17 can be of any desired shape or form. The electrode 17 of a picture element is supplied with voltage signals by a signal line 18, schematically indicated in the Figure. A second signal line 19 is connected to an electrode that is in contact with the conductive second fluid 12. This electrode may be common to all elements, when they are fluidly interconnected by and share the second fluid, uninterrupted by walls. The picture element 2 can be controlled by a voltage V applied between the signal lines 18 and 19. The electrodes 17 on the substrate 7 are coupled to a display driving system. In a display device having the picture elements arranged in a matrix form, the electrodes can be coupled to a matrix of control lines on the substrate 7.

The first fluid 11 is confined to one picture element by walls 20 that follow the cross-section of the picture element. The cross-section of a picture element may have any shape; when the picture elements are arranged in a matrix form, the cross-section is usually square or rectangular. Although the walls are shown as structures protruding from the insulating layer 13, they may instead be a surface layer of the support plate that repels the first fluid, such as a hydrophilic or less hydrophobic layer. The walls may extend from the first to the second support plate but may also extend partly from the first support plate to the second support plate as shown in FIG. 1. The extent of the picture element, indicated by the dashed lines 3 and 4, is defined by the centre of the walls 20. The area between the walls of a picture element, indicated by the dashed lines 21 and 22, is called the display area 23, over which a display effect occurs.

Figure 2:
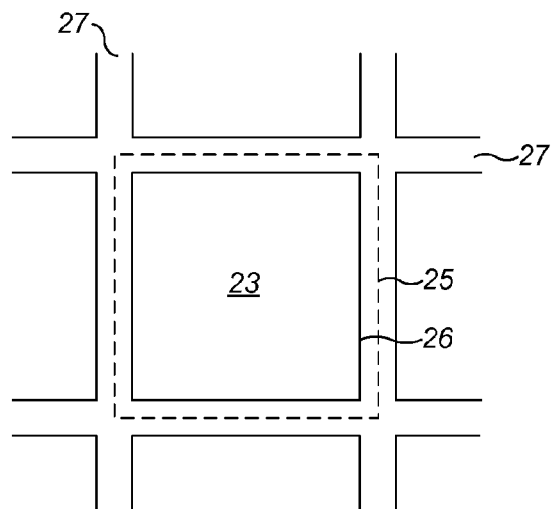
FIG. 2 shows a schematic plan view of the first support plate of the display device.

FIG. 2 shows a matrix of square picture elements in a plan view of the hydrophobic layer of the first support plate. The extent of the central picture element in FIG. 2, corresponding to the dashed lines 3 and 4 in FIG. 1, is indicated by the dashed line 25. Line 26 indicates the inner border of a wall; the line is also the edge of the display area 23. The pattern of the walls 20 covers a first area 27.

When no voltage is applied between the electrodes, the first fluid 11 forms a layer between the walls 20, as shown in the FIG. 1. Application of a voltage will contract the first fluid, for example against a wall as shown by the dashed shape 24 in FIG. 1. The controllable shape of the first fluid is used to operate the picture element as a light valve, providing a display effect over the display area 23.

During the manufacturing process of the display device, the first support plate may be manufactured, or may be provided partly or completely assembled. When manufacturing the first support plate the substrate 7 is provided. An electrode structure comprising at least one electrode 17 is provided on the substrate 7. Subsequently, the insulating layer 13 including in this embodiment the barrier layer 16 and the hydrophobic layer 15 is arranged on the electrode structure. Firstly, the barrier layer may be provided using Chemical Vapour Deposition (CVD) or Physical Vapour Deposition (PVD) for example sputter deposition or electron beam evaporation where temperature, pressure and power are controlled appropriately, as would be understood by the skilled person.

The hydrophobic layer 15 may then be provided on the barrier layer. Referring to FIG. 3 which shows a cross section of the hydrophobic layer 15, and in accordance with embodiments described herein, the hydrophobic layer 15 comprises a first hydrophobic layer 30 and a second hydrophobic layer 32. The first hydrophobic layer 30 may be provided on the barrier layer 16 by for example a wet coating process such as flexoprinting, spin coating or dip coating as is well known in the art. The first hydrophobic layer is therefore provided on the substrate. In this embodiment, as illustrated in FIGS. 1 and 3, the first hydrophobic layer 30 is a continuous, uninterrupted layer common to all picture elements.

The surface 34 of the first hydrophobic layer 32 is prepared for application of the walls 20 by a process step reducing the hydrophobicity of the surface. This step may include reactive ion etching and/or a plasma treatment known to the skilled person. The part of the surface 34 outside the area of the display device where the image is formed may be screened off from this step. The area where the image is formed is the area of the totality of display areas and the in-between walls.

The walls may be arranged on the surface 34 in the first area 27 using a known method, which may involve spinning the wall material, e.g. SU8, onto the surface, pre-baking the layer of wall material, patterning the layer using photolithography and removing the wall material from the display area 23. SU8 is a hydrophilic material and thus in this step of the method a pattern of hydrophilic material is provided on a first part of the surface 34.

After providing the walls, the surface 34 of the display areas 23 remains with a reduced hydrophobicity. A second hydrophobic layer 32 is provided on at least part of the surface 34 of the display areas with the reduced hydrophobicity, i.e. a second part of the surface 34, which is not covered by walls. Thus, the second hydrophobic layer is provided in a pattern to form at least one of the display areas 23. This step provides the surface 14 of the hydrophobic layer 15 facing the space 10 in FIG. 1. The second hydrophobic layer 32 gives the surface 14 facing the space a higher hydrophobicity than the surface 34 of the first hydrophobic layer with a reduced hydrophobicity.

The second hydrophobic layer 32 may be provided as a solution of hydrophobic material using inkjet printing or wet processing methods such as slit coating, flex printing, screen printing or spin coating techniques, which are well known to the skilled person. Then, the second hydrophobic layer may be heated at a temperature to bake the SU8 layer and completely remove solvent from the second hydrophobic layer, thus completing assembling of the first support plate. The conditions for providing the second hydrophobic layer are selected to obtain the desired properties of the second hydrophobic layer; such conditions include hydrophobic solution/solvent viscosity, solvent/solution boiling point, solid weight volume, wetting properties of the solution, second hydrophobic layer material and process parameters inherent to the chosen method of applying the second hydrophobic layer, for example a coating speed in slit or spin coating, or the droplet impact in inkjet printing. The method of embodiments therefore uses a lower temperature step compared with known methods which use a higher temperature annealing step at for example 220° C.

In this embodiment the first hydrophobic layer and the second hydrophobic layer 30, 32, are of the same material, although the first hydrophobic layer may have a greater wettability to the second fluid than the second hydrophobic layer, in view of the reactive ion etching/plasma step described above. In other embodiments the first and second hydrophobic layers may have different hydrophobicities and may be formed of different materials which for example are both hydrophobic, but where the second hydrophobic layer has a greater hydrophobicity than the first hydrophobic layer. For example, the first hydrophobic layer may have an advanced contact angle of 120 degrees and a receding angle of 110 degrees, with respect to the second fluid, and the second hydrophobic layer may have an advanced angle of 125 degrees and a receding angle of 116 degrees, with respect to the second fluid. In some embodiments, the first and second hydrophobic layer materials may be selected from the following list, although other materials are envisaged in further embodiments: an amorphous fluoropolymer layer such as AF1600 or AF1601 (available from DuPont, 1007 Market St., Wilmington, Del., USA), Hyflon AD® (available from Solvay, Solvay SA, rue de Ransbeek, 310-B-1120 Brussels, Belgium), Cytop (available from AGC Chemicals Europe, Ltd, PO Box 4, York House, Hillhouse International, Thornton Cleveleys, Lancashire FY5 4QD, United Kingdom) or any other low surface energy polymer. As the skilled person will understand, the ratio of copolymers in such compounds and/or the polymer molecular weight may be selected so the hydrophobic layers have pre-determined properties, such as a required solubility in a solvent and hydrophobic solution viscosity for being ink jet printed.

The thickness of the first and second hydrophobic layers may be substantially the same or different from each other. This thickness is defined in a direction perpendicular the plane P-P of the substrate 7. In this embodiment the first hydrophobic layer 30 has a thickness $T_1$ greater than a thickness $T_2$ of the second hydrophobic layer 32. For example, the first hydrophobic layer 30 may have a thickness $T_1$ of 40 to 110 nanometers, 45 to 105 nanometers or 50 to 100 nanometers, and the second hydrophobic layer may have a thickness $T_2$ of 350 to 850 nanometers, 375 to 825 nanometers or 400 to 800 nanometers.

In an example where the second hydrophobic layer is provided using ink jet printing, the viscosity of the hydrophobic polymer solution is in the range of 2 to 20 centiPoise (cP) at an appropriate temperature for applying the solution to form a uniform layer, and the droplet volume jetted by the ink jet printer is 10 picoliters (pl). To provide the second hydrophobic layer with a thickness of 40 nanometers, for one picture element with internal dimensions for example of 150×150×4 micrometers, approximately 90 μl of a 1% solid weight polymer solution is required to be ink jet printed. One inkjet nozzle may be used to provide the second hydrophobic layer for all picture elements, or a different nozzle may be used per picture element.

After completion of the manufacture of the first support plate 5, the first fluid 11 is applied using a known method, as disclosed for example in International patent publication no. WO2005/098797. The first support plate 5 and second support plate 6 are mounted together using e.g. pressure-sensitive adhesive, after the space 10 has been filled with the second liquid 12 in known manner, as disclosed e.g. in International patent publication no. WO2009/065909.

To determine the presence of the first and second hydrophobic layers in an assembled device a micrograph of a cross section of the hydrophobic layer 15 may be taken and analysed. To determine the thickness of the second hydrophobic layer, for example, the display device can be disassembled, removing any walls using a solvent for the wall material, and the thickness of the hydrophobic layer can be taken over the boundary between the first area 27, where the wall 20 was located, and the display area 23. The thickness can be measured using a measuring device such as the Filmtek made by the company Scientific Computing International; this thickness can then be used to map a surface profile. Alternatively a profile scanner can be used.

The above embodiments are to be understood as illustrative examples. Further embodiments are envisaged. For example, although embodiments have been elucidated with reference to an electrowetting display device, embodiments apply to any electrowetting device where hydrophilic material has to be arranged on a hydrophobic layer. Examples of other electrowetting devices are electrowetting optical elements such as electrowetting diaphragms and shutters, and lab-on-a-chip devices.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. A method of manufacturing a support plate for an electrowetting device, comprising:
   a) providing a substrate;
   b) providing a first hydrophobic layer on the substrate;
   c) reducing a hydrophobicity of a surface of the first hydrophobic layer to obtain a reduced hydrophobicity surface of the first hydrophobic layer; and
   d) providing a second hydrophobic layer on at least part of the reduced hydrophobicity surface.

2. The method according to claim 1, comprising, after the reducing the hydrophobicity of the surface in c), providing a pattern of hydrophilic material on a first part of the reduced hydrophobicity surface, the providing the second hydrophobic layer in d) comprising providing the second hydrophobic layer on a second part of the reduced hydrophobicity surface.

3. The method according to claim 2, wherein the pattern of hydrophilic material is a wall structure pattern for a picture element of the electrowetting device.

4. The method according to claim 1, the providing the second hydrophobic layer in d) comprising providing the second hydrophobic layer in a display area pattern corresponding to at least one display area for a picture element of the electrowetting device.

5. The method according to claim 1, wherein the first hydrophobic layer in b) has a first hydrophobicity which is one or more of: different from, or substantially the same as, a second hydrophobicity of the second hydrophobic layer.

6. The method according to claim 1, the providing the second hydrophobic layer in d) comprising using one or more of: inkjet printing, slit coating, flex printing, screen printing or spin coating.

7. The method according to claim 1, comprising using inkjet printing for the providing the second hydrophobic layer in d) to provide the second hydrophobic layer for a plurality of picture elements of the electrowetting device using one or more of: one inkjet nozzle, or a respective inkjet nozzle for each of the plurality of picture elements.

8. The method according to claim 1, the second hydrophobic layer having a second hydrophobic layer thickness of one or more of: 40 to 110 nanometers, 45 to 105 nanometers, or 50 to 100 nanometers.

9. The method according to claim 1, wherein on the substrate, there is at least one electrode, and a barrier layer on the at least one electrode, the providing the first hydrophobic layer in b) comprising providing the first hydrophobic layer on the barrier layer.

10. The method according to claim 1, wherein the first hydrophobic layer in b) has a first hydrophobic layer thickness of one or more of: 350 to 850 nanometers, 375 to 825 nanometers, or 400 to 800 nanometers.

11. A support plate for an electrowetting device, the support plate comprising a substrate, at least one layer on the substrate, a first hydrophobic layer on the at least one layer and a second hydrophobic layer on at least part of the first hydrophobic layer.

12. The support plate according to claim 11, wherein the second hydrophobic layer has a display area pattern corresponding to at least one display area for a picture element of an electrowetting device.

13. The support plate according to claim 11, wherein a first hydrophobicity of the first hydrophobic layer is one or more of: different from, or substantially the same as, a second hydrophobicity of the second hydrophobic layer.

14. The support plate according to claim 11, wherein the first hydrophobic layer is thicker than the second hydrophobic layer in a direction perpendicular to a plane of the substrate.

15. The support plate according to claim 14, wherein the first hydrophobic layer has a first hydrophobic layer thickness of one or more of: 350 to 850 nanometers; 375 to 825 nanometers; or 400 to 800 nanometers, and the second hydrophobic layer has a second hydrophobic layer thickness of one or more of: 40 to 110 nanometers; 45 to 105 nanometers; or 50 to 100 nanometers.

16. The support plate according to claim 11, wherein the at least one layer comprises at least one electrode and a barrier layer on the at least one electrode.

17. An apparatus for manufacturing a support plate for an electrowetting device, the apparatus comprising:
a first hydrophobic layer providing system configured to provide a first hydrophobic layer on a substrate;
a hydrophobicity reducing system configured to reduce a hydrophobicity of a surface of the first hydrophobic layer to obtain a reduced hydrophobicity surface of the first hydrophobic layer; and
a second hydrophobic layer providing system configured to provide a second hydrophobic layer on at least part of the reduced hydrophobicity surface.

18. The apparatus according to claim 17, wherein at least one of the first hydrophobic layer providing system or the second hydrophobic layer providing system comprises one or more of: an inkjet printing system, a slit coating system, a flex printing system, a screen printing system or a spin coating system.

19. An electrowetting device comprising a support plate comprising a substrate, at least one layer on the substrate, a first hydrophobic layer on the at least one layer and a second hydrophobic layer on at least part of the first hydrophobic layer.

20. The electrowetting device according to claim 19,
the support plate being a first support plate comprising an electrode,
the electrowetting device comprising:
a second support plate; and
a picture element comprising:
a first fluid; and
a second fluid immiscible with the first fluid,
the first fluid and the second fluid located between the first support plate and the second support plate, at least one of the first fluid or the second fluid in contact with a surface of the second hydrophobic layer.

21. The electrowetting device according to claim 19, comprising a pattern of hydrophilic material on a first part of the first hydrophobic layer, the second hydrophobic layer located on a second part of the first hydrophobic layer.

22. The electrowetting device according to claim 19, the second hydrophobic layer having a display area pattern for a plurality of picture elements, the plurality of picture elements comprising the picture element, and the display area pattern comprising a display area of the picture element.

23. The electrowetting device according to claim 19, wherein the first hydrophobic layer has a first hydrophobicity and the second hydrophobic layer has a second hydrophobicity different from the first hydrophobicity.

24. The electrowetting device according to claim 19, wherein the first hydrophobic layer is thicker than the second hydrophobic layer in a direction perpendicular to a plane of the substrate.

25. The electrowetting device according to claim 24, wherein the first hydrophobic layer has a first hydrophobic layer thickness of one or more of:
350 to 850 nanometers;
375 to 825 nanometers; or
400 to 800 nanometers, and
the second hydrophobic layer has a second hydrophobic layer thickness of one or more of:
40 to 110 nanometers;
45 to 105 nanometers; or
50 to 100 nanometers.

* * * * *